Patented July 13, 1954

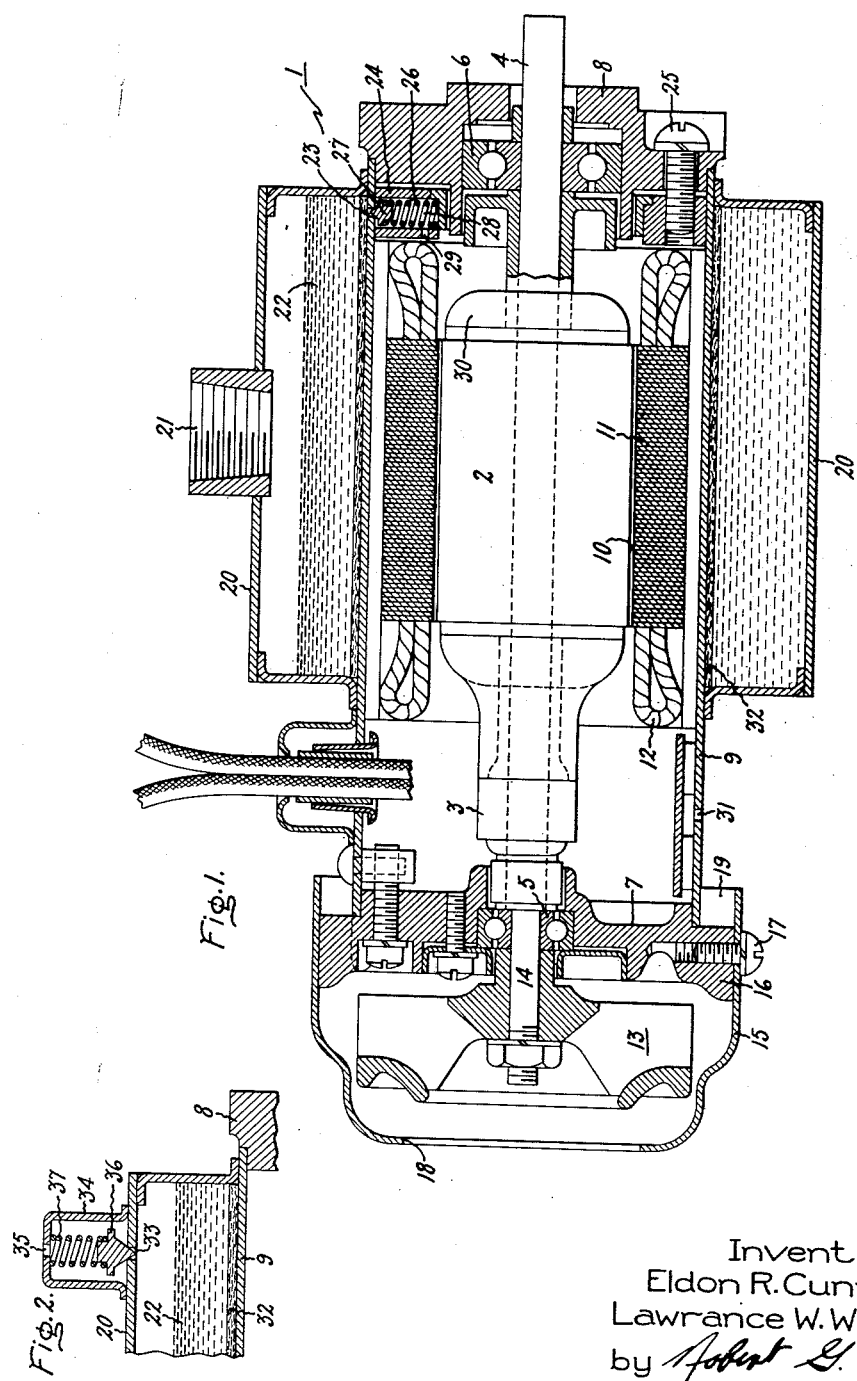
Inventors:
Eldon R. Cunningham,
Lawrance W. Wightman,
by Robert G. Iris
Their Attorney.

2,683,823

UNITED STATES PATENT OFFICE 2,683,823

COOLING OF ELECTRICAL APPARATUS

Eldon R. Cunningham and Lawrance W. Wightman, Fort Wayne, Ind., assignors to General Electric Company, a corporation of New York Application January 19, 1953, Serial No. 332,052

8 Claims. (Cl. 310—52)

This invention relates to electrical apparatus and more particularly to arrangements for cooling such apparatus.

In the design of electrical apparatus for use at very high altitudes, such as electric motors used on aircraft, special consideration must be given to the problem of cooling. It has been found that the normal procedures of ventilation with air as the medium of heat transfer yield very small gains over non-ventilating designs at altitudes over 50,000 ft. It is therefore desirable to provide a cooling system for electrical apparatus which does not depend on the ambient air alone as a heat transfer medium so that adequate cooling up to a much greater altitude is possible.

An object of this invention, therefore, is to provide improved electrical apparatus having a cooling system incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming part of this specification.

In accordance with the preferred embodiment of this invention, the exterior of the device being cooled is surrounded by a chamber containing a volatile fluid such as water. The chamber is provided with a pressure relief valve which releases when the pressure exceeds a predetermined value, for example corresponding to the boiling point of the fluid. The relief valve is arranged to vent into the interior of the machine thus obtaining additional heat transfer.

In accordance with a modification of this invention, the relief valve is arranged to vent to the exterior of the machine rather than to the interior of the machine.

In the drawing, Fig. 1 is a side elevational view partly in section illustrating the improved cooling system of the invention; and Fig. 2 is a fragmentary side elevational view illustrating a modified form of this invention.

Referring now to the drawing, there is shown a direct current aircraft-type motor generally identified as 1 having an armature 2 and commutator 3 mounted on a shaft 4. Shaft 4 is rotatably supported by bearings 5 and 6 respectively carried by end shields 7 and 8 which in turn complete the enclosure of cylindrical casing member 9. Armature 2 is arranged within the bore 10 of stator member 11 which in turn is mounted within casing member 9 and has suitable field windings 12.

The motor 1 may be air ventilated at lower altitudes by means of a suitable fan 13 mounted on extension 14 of shaft 4 on the side of end shield remote from armature 2. A casing member 15 surrounds fan 13 and is mounted on a plurality of outwardly extending spokes 16 formed on the outer periphery of end shield 7 and secured thereto in any suitable manner, as by screws 17. Fan 13 draws air into the casing 15 through an opening 18 and discharges the air over the outer periphery of motor casing 9 through the passages 19 formed between casing 15 and casing 9.

At very high altitudes, the air ventilation provided by fan 13 is ineffective by virtue of the decreased density of the air thus rendering it less efficient as a heat transfer medium and in order to provide the necessary cooling of the motor at these high altitudes, the arrangement now to be described is provided. A chamber 20 circumferentially surrounds the casing 9 in the region of stator 11 and a suitable volatile fluid 22, such as water, is introduced thereto through a filling opening 21. Water is the preferable fluid because of its high heat of evaporation, ease of procurement, and non-toxicity, as compared to other materials, however it will be readily understood that other volatile fluids or mixtures with water may be used if desired. The chamber 20 is filled to the level shown thus allowing for expansion of water or ice in the event of freezing to prevent damage to the chamber. It is thus seen that the mere presence of a body of volatile fluid, such as water, surrounding the stator 11 and rotor 2 will abstract a considerable quantity of heat from the interior of the machine.

In order to provide for further cooling of the machine, a plurality of openings 23 are formed in casing 9 communicating with the interior of chamber 20. A valve ring 24 is mounted within casing 9 and secured to case 9 by brazing or welding. Valve ring 24 provides means for securing end shield 8 to case 9 by screws 25. Valve ring 24 has a plurality of valve openings 26 formed therein respectively communicating with openings 23 in casing 9. Valves 27 are respectively positioned in the valve openings 26 and biased against openings 23 by springs 28. Ports 29 communicate with the valve openings 26 and the interior of the casing 9.

It will now be seen that the pressure relief valves 27 will release when the pressure within the chamber 20 reaches a predetermined value. This pressure preferably is that corresponding the temperature desired to be maintained. For example, if the casing 9 is to be maintained at 150° C., so as to limit the temperature of the armature 2, which is the hottest element of the motor, to 200° C., the relief valves 27 are preset to release at approximately 67 lbs. pressure absolute which is the pressure of saturated steam at 150° C. It is thus seen that as the heat developed within the motor causes the water in chamber 20 to boil thus creating steam and abstracting heat from the interior of the machine in the process, the pressure relief valve 27 will vent this steam from the chamber 20 at a predetermined steam pressure thus preventing the steam in the chamber 20 from exceeding the temperature corresponding to the release pressure of valves 27. In addition, the relief valves 27 are arranged to vent into the interior of the motor through ports 29 to obtain additional heat transfer. It will be seen that ports 29 direct the steam against the end turns 12 of stator 11 so that additional heat is removed. While the ports 29 are shown as directing the jets of steam against end turns 12, these jets may be alternatively directed toward the end turns 30 of armature 2. The steam in the interior casing 9 escapes to the atmosphere through explosion-proof opening 31 in casing 9.

It will be seen that the pressure, and thus the corresponding maximum temperature of the fluid, at which the valves 27 open is affected by the atmospheric pressure. At zero atmospheric pressure, the valves 27 would open at a pressure determined solely by the valve spring 28. At finite values of atmospheric pressure, however, the pressure at which the valves 27 open is the spring pressure plus the atmospheric pressure. Thus, the valves 27 operate on differential pressure, the pressure and corresponding boiling temperature required to open the valve increasing as the atmospheric pressure increases from zero. Therefore, the temperature maintained varies with altitude up to the limit of the atmosphere. This characteristic is desirable since at low altitudes where air cooling is most effective, the valves 27 open at a higher pressure and temperature thus placing greater reliance on air cooling, while at high altitudes where air cooling is least effective, the valves open at lower pressure and temperature to compensate for the lack of air. This arrangement conserves the supply of water in chamber 20 for the higher altitude or higher output conditions.

In order to prevent the temperature gradients from the hottest part of casing 9 to the water from becoming so large that hot spots will appear on casing 9, the sleeve 32 of absorbent material such as wool felt or glass tape, is arranged in the chamber 20 around and in contact with the exterior surface of casing 9. The sleeve 32 insures that the water at all times wets all portions of the exterior surface of casing 9 within chamber 20 even though the water level may be insufficient to completely cover the casing.

At least two valves 27 are preferably provided in order to reduce the probability of failure. It will be readily apparent however, that only one valve may be provided if desired and that more than two may be provided in order to vent a greater amount of steam into the interior of the motor. Since the openings 23 in the casing 9 form the valve seats, the valve ring 24 does not have to be sealed watertight but merely held in place mechanically, i. e., welded or brazed as previously indicated. It will be readily apparent that the end shield 8 and the valve ring 24 may be readily removed so that the valves 27 and springs 28 can also be removed and the valve seats 23 serviced if necessary.

It will now be readily seen that the utilization of vapor cooling of the internal surfaces of the motor provides a degree of "feedback" in the system since the cooling of the internal elements of the machine by venting the vapor to the interior thereof will cause the casing 9 to cool below the boiling point of the water more quickly than if the interior elements of the machine were not cooling in this manner. In addition, the introduction of moisture into the interior of the machine will provide a marked increase in the brush life in the case of direct current machines. Furthermore, the presence of the vapor in the air gap increases the heat transfer between the rotor and stator by increasing the density in the air gap.

Referring now to Fig. 2, in which like parts are indicated by like reference numerals, there is shown an alternative construction wherein the vapor produced by heating of the water 22 in chamber 20 is discharged to the atmosphere without entering the interior of the machine. In this construction, an opening 33 is formed in the exterior wall of chamber 20 surrounded by a valve body 34 having an exhaust port 35. Valve 36 is arranged in the valve body 34 and is biased against opening 33 by means of spring 37. This arrangement may be desirable for certain machine designs having high thermal conductivity between the stator 11 and the chamber 20, or for designs in which the vapor would be detrimental to the interior of the machine.

While this invention has been shown as being applied to a direct current commutator machine, it will be readily apparent that it is equally applicable to an alternating current machine such as an induction motor or an alternator. Furthermore, while a motor is shown as being cooled in accordance with this invention, it will be readily apparent that any other electrical apparatus may be similarly cooled, such as a solenoid or any other device having electrical losses.

While we have shown and described a particular embodiment of this invention, further modifications and improvements will occur to those skilled in the art. We desire that it be understood, therefore, that this invention is not limited to the form shown and we intend in the appended claims to cover all modifications which do not depart from the spirit and scope of this invention.

What we claim as new and desire to secure by Letters Patent of the United States is:

1. In combination, electrical apparatus having an enclosing casing, a chamber formed on the exterior of said casing and adapted to contain a volatile fluid for cooling said apparatus, and means for venting vapor created by vaporization of said fluid due to heating of said apparatus to the interior of said casing for further cooling said apparatus.

2. In combination, electrical apparatus having an enclosing casing, a chamber formed on the exterior of said casing and adapted to contain a volatile fluid for cooling said apparatus, a passage communicating with said chamber and the interior of said casing, and means in said passage operable in response to a predetermined pressure of the vapor created by vaporization of said fluid due to heating of said apparatus for venting said vapor to the interior of said casing for further cooling said apparatus.

3. In combination, electrical apparatus having an enclosing casing, a chamber formed on the exterior of said casing and adapted to contain a volatile fluid for cooling said apparatus, a passage communicating with said chamber and the interior of said casing, and a pressure relief valve in said passage operable in response to a predetermined pressure of the vapor in said chamber created by vaporization of said fluid due to heating of said apparatus for venting said vapor to the interior of said casing for further cooling said apparatus.

4. In combination, electrical apparatus having an enclosing casing, a chamber formed on the exterior of said casing and adapted to contain a volatile fluid for cooling said apparatus, a passage communicating with said chamber and the interior of said casing, a pressure relief valve in said passage operable in response to a predetermined pressure of the vapor in said chamber created by vaporization of said fluid due to heating of said apparatus for venting said vapor to the interior of said casing for further cooling said apparatus, and absorbent material in said chamber and contacting the exterior wall of said casing.

5. In combination, electrical apparatus having an enclosing casing, a chamber formed on the exterior of said casing and adapted to contain a volatile fluid for cooling said apparatus, a passage communicating with said chamber and the interior of said casing, and a pressure relief valve in said passage operable in response to a predetermined pressure of the vapor in said chamber created by vaporization of said fluid due to heating of said apparatus for venting said vapor to the interior of said casing for further cooling said apparatus, said casing having an opening formed therein communicating with the exterior thereof for venting said vapor to the atmosphere.

6. In combination, electrical apparatus having a substantially cylindrical enclosing casing, a chamber circumferentially surrounding said casing and adapted to contain a volatile fluid for cooling said apparatus, a passage communicating with said chamber and the interior of said casing, a pressure relief valve in said passage operable in response to a predetermined pressure of the vapor in said chamber created by vaporization of said fluid due to heating of said apparatus for venting said vapor to the interior of said casing for further cooling said apparatus, and a sleeve of absorbent material in said chamber embracing the exterior wall of said casing, said casing having an opening formed therein communicating with the exterior thereof for venting said vapor to the atmosphere.

7. A dynamoelectric machine having a rotor member, a stator member, and a substantially cylindrical enclosing casing, a chamber circumferentially surrounding said casing and adapted to contain a volatile fluid for cooling said machine, a passage communicating with said chamber and the interior of said casing, a pressure relief valve in said passage operable in response to a predetermined pressure of the vapor in said chamber created by the vaporization of said fluid due to heating of said machine for venting said vapor to the interior of said casing for further cooling said machine, said pressure relief valve having a port arranged to exhaust said vapor against one of said members, and a sleeve of absorbent material in said chamber embracing the exterior wall of said casing, said casing having an opening formed therein communicating with the exterior thereof for venting said vapor to the atmosphere.

8. In combination, electrical apparatus having an enclosing casing, a chamber formed in the exterior of said casing and adapted to contain a volatile fluid for cooling said apparatus, a passage communicating with said chamber and the atmosphere, and a pressure relief valve in said passage operable in response to a predetermined pressure of the vapor in said chamber created by vaporization of said fluid due to heating of said apparatus for venting said vapor to the atmosphere, and absorbent material in said chamber and contacting the exterior wall of said casing.

References Cited in the file of this patent

UNITED STATES PATENTS

| Number | Name | Date |
|---|---|---|
| 853,550 | Kando | May 14, 1907 |
| 1,494,134 | Ritterrath | May 13, 1924 |
| 2,364,000 | Sawyer | Nov. 28, 1944 |
| 2,510,632 | Hemphill | June 6, 1950 |

FOREIGN PATENTS

| Number | Country | Date |
|---|---|---|
| 37,816 | Austria | July 10, 1909 |
| 534,547 | Great Britain | Mar. 10, 1941 |